UNITED STATES PATENT OFFICE.

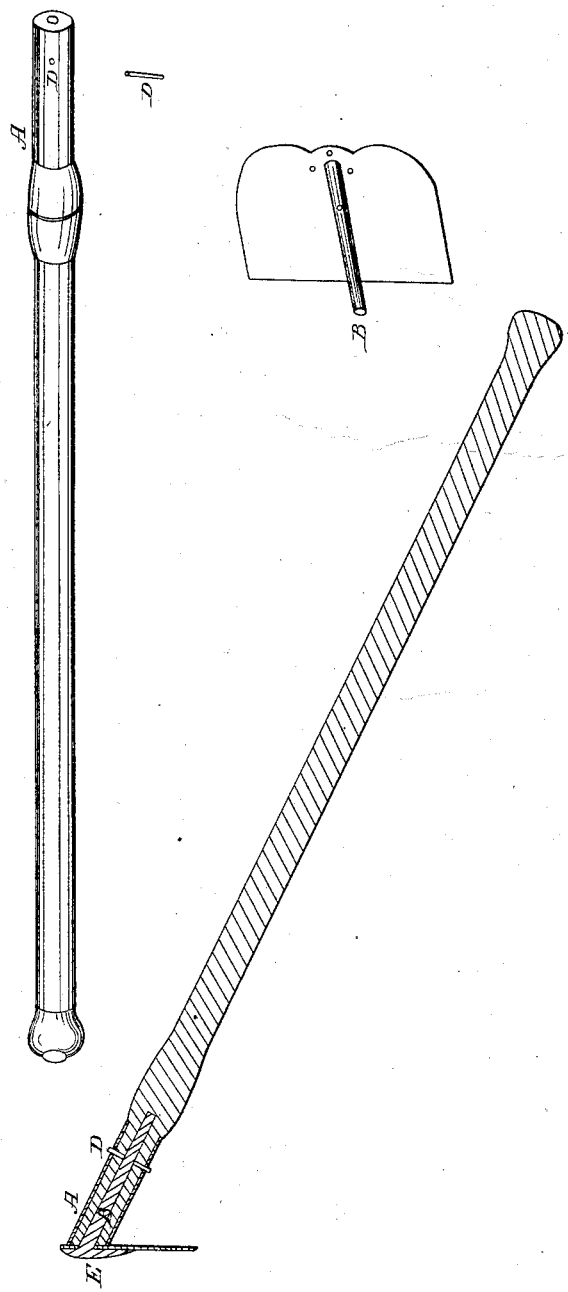

GEO. HIGHT, OF GORHAM, MAINE.

MODE OF FASTENING HOE-HANDLES.

Specification of Letters Patent No. 751, dated May 25, 1838.

*To all whom it may concern:*

Be it known that I, GEORGE HIGHT, of Gorham, in the county of Cumberland and State of Maine, have invented a new and Improved Mode of Connecting and Fastening Hoes to Their Handles; and I hereby declare that the following is a full and complete description.

My invention consists of a shank round or square marked B in the annexed drawing, running through the plate of the hoe and having a large head, marked E and fastened to the under or outer side of the plate with rivets; and a ferrule marked A, on the said drawing made of brass or iron fitted upon the lower end of the hoe handle with the lower end of the ferrule and handle cut to make a perfect joint upon the inner or upper side of the plate. A hole is made in the end of the handle within the ferrule into which the shank is driven and secured by a key or pin marked D in the drawing and running through the ferrule and shank; or with a screw cut upon the shank and screwed into the handle..

What I claim as my invention and desire to secure by Letters Patent is—

The above described mode of securing the hoe to the handle by riveting the hoe plate onto the shank plate and securing the shank in the handle by means of a wedge or pin, or by a screw, in combination as above described.

GEORGE HIGHT.

Witnesses:
ERASTUS HAYES,
NATHAN O. MITCHELL.